Figure 1:
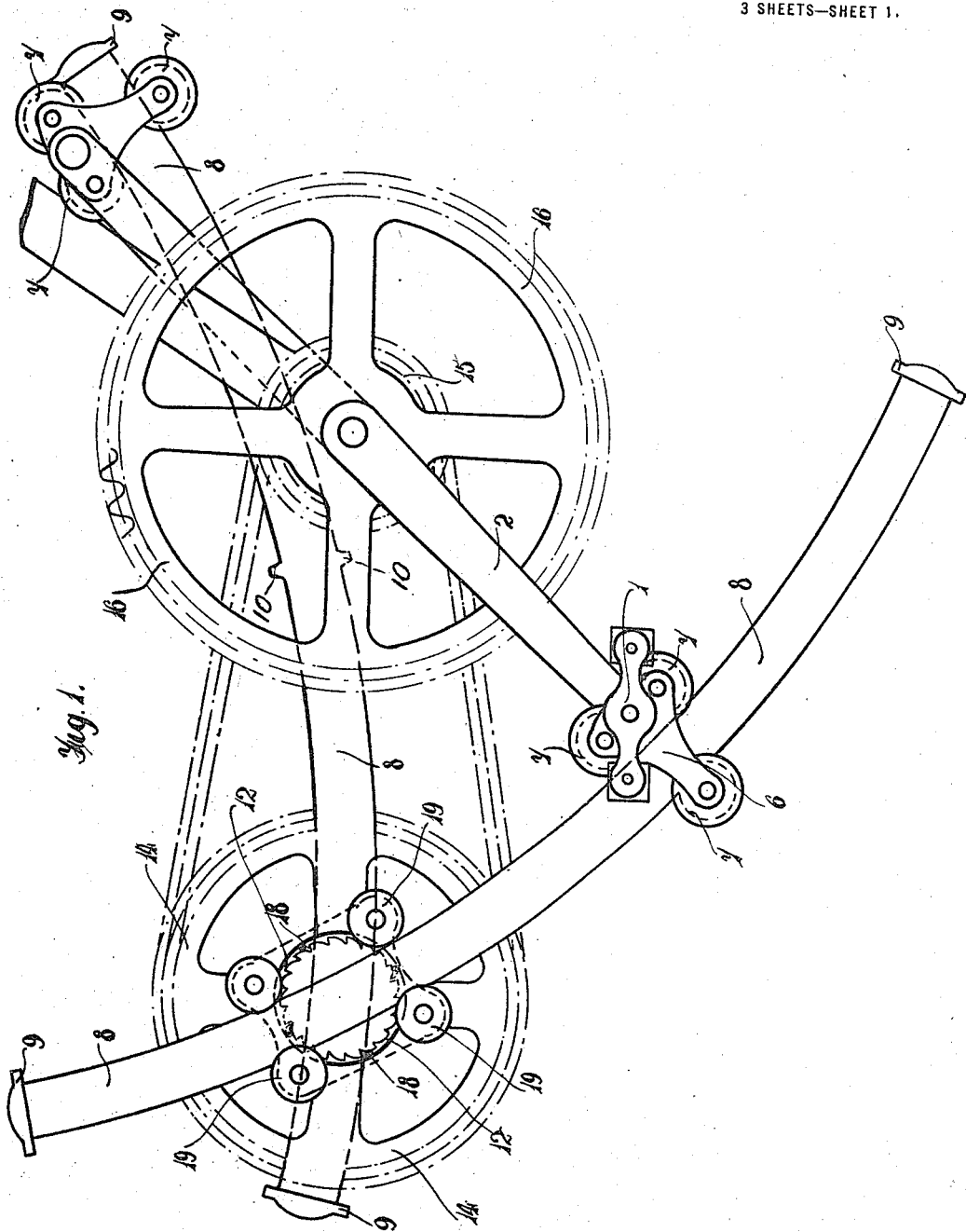

H. B. JOHNSTON.
PEDAL DRIVING GEAR FOR CYCLES AND THE LIKE.
APPLICATION FILED NOV. 5, 1917.

1,268,851.

Patented June 11, 1918.
3 SHEETS—SHEET 3.

Inventor:-
Henry Bannister Johnston,
By:- B. Singer.
Atty.

UNITED STATES PATENT OFFICE.

HENRY BANNISTER JOHNSTON, OF HANDSWORTH, BIRMINGHAM, ENGLAND.

PEDAL DRIVING-GEAR FOR CYCLES AND THE LIKE.

1,268,851.     Specification of Letters Patent.   Patented June 11, 1918.

Application filed November 5, 1917. Serial No. 200,443.

*To all whom it may concern:*

Be it known that I, HENRY BANNISTER JOHNSTON, residing at 12 Regent road, Handsworth, Birmingham, in the county of Warwick, England, have invented certain new and useful Improvements in Pedal Driving-Gear for Cycles and the like; and I do hereby declare the following to be a full, clear, and exact description of the same.

My invention comprises improvements in pedal driving gear for cycles and the like and refers to that class of such gearing in which revolving pedals engage with reciprocating levers which drive the machine through one-way clutch mechanism, the levers having a telescopic connection with the pedals and clutch for the purpose of obtaining greater leverage on the down stroke than on the up stroke; the object of the present invention being to provide improved gearing for this purpose.

According to this invention I provide pedal driving gear for cycles and the like embodying in combination a spindle carrying a pedal crank, and a gear box containing a one-way clutch and adapted to be reciprocated by a lever, said lever being connected to the pedal and gear box in such manner as to permit a sliding movement between the lever and the pedal and gear box.

Referring to the drawings:—

Figure 1. is an elevation of pedal driving gear for a bicycle according to this invention.

Figure 2:
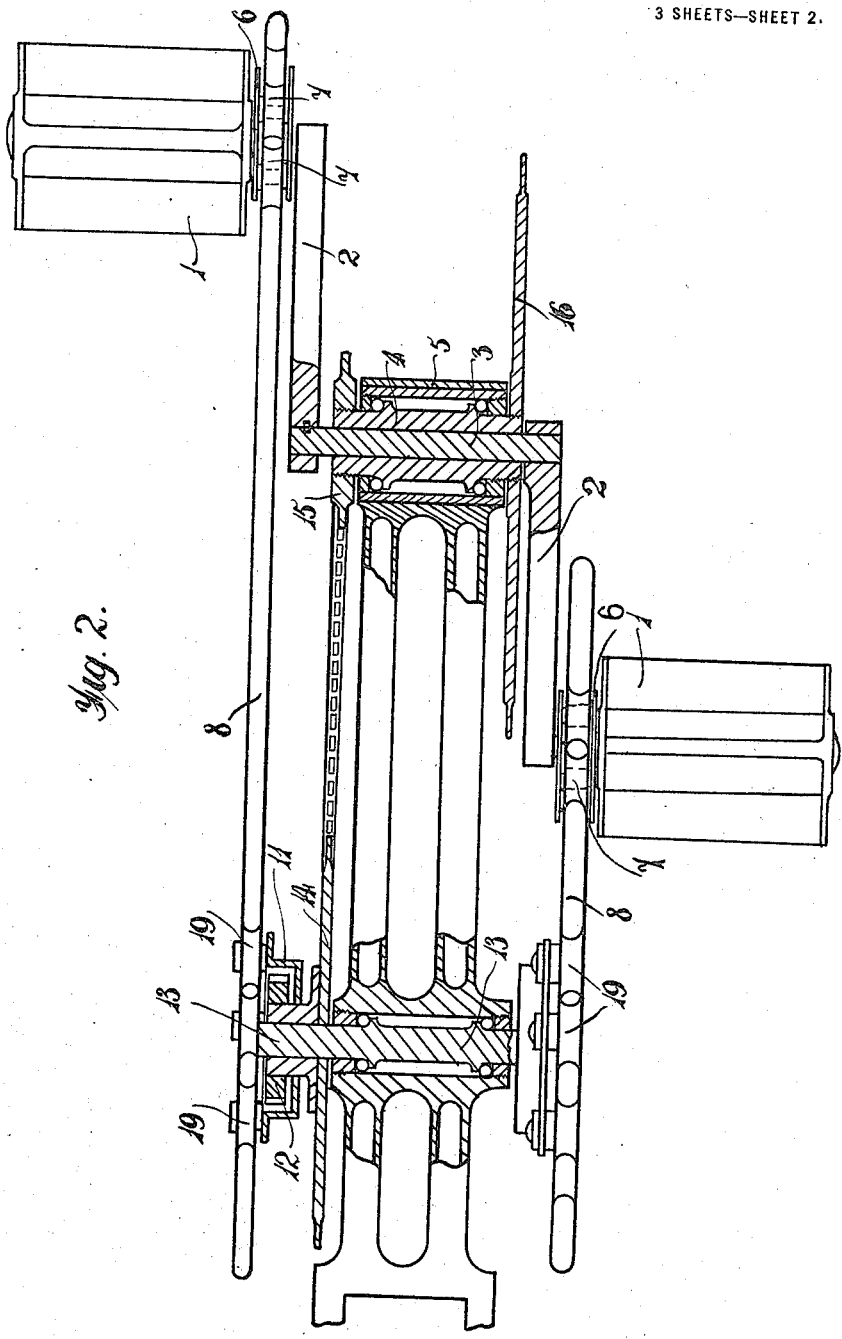

Fig. 2. is a sectional plan of same.

Figure 3:
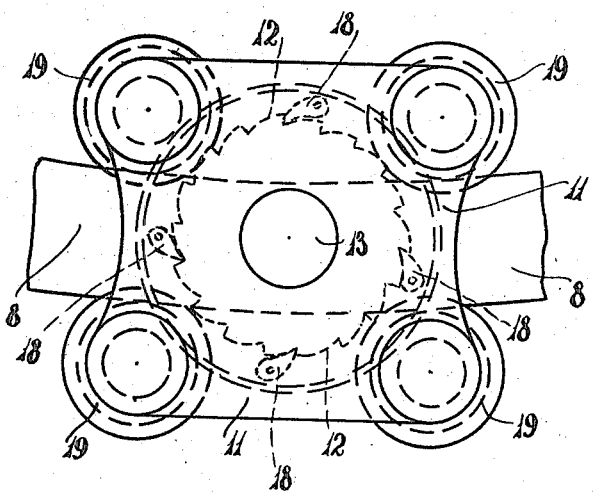

Fig. 3. is a side elevation showing one of the gear boxes containing the one-way clutch mechanism.

Figure 4:
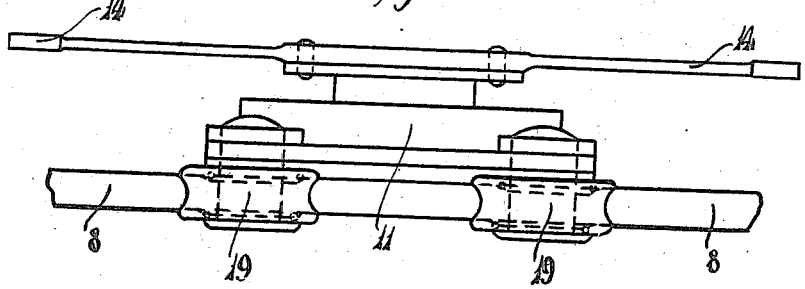

Fig. 4. is a plan of same.

In carrying my invention into practice as illustrated upon the accompanying drawings the pedals 1 are carried by cranks 2 which are secured upon a spindle 3 which is free to rotate within a sleeve 4 rotatably mounted in a bearing 5.

Each of the pedals or cranks carries a plate 6 carrying three rollers 7 whereby the cranks are slidably connected to the sliding levers 8, said levers having abutments 9 and 10 which are adapted to be engaged by the said rollers 7 as they travel along the lever and thus extend or shorten the effective length of the leverage in manner hereinafter explained by varying the length of leverage between the gear box 11 and pedal.

There are two gear boxes 11, one connected to each lever, and each contains a ratchet wheel 12 mounted upon a spindle 13 which carries a sprocket wheel 14 which by an endless chain drives a sprocket wheel 15 on the afore-mentioned pedal shaft 4 which also carries a sprocket wheel 16 which through an endless chain drives the rear wheel of the bicycle in the usual way. The gear box carries a series of pawls 18 engaging with the ratchet wheel 12 so arranged that the reciprocation of each lever in a vertical plane will intermittently rotate the ratchet wheel and thus drive the machine, the ratchet wheel and pawl being so arranged that on the down stroke of the pedal the pawls will rotate the ratchet while on the up stroke the pawls will merely pass over said ratchet. When one pedal is falling the other is rising so that there is a continuous rotation of the spindle 13.

As the pedal is descending below the horizontal it is approaching the spindle 13 and in doing so the rollers 7 may engage with the abutment 10 serving to move the lever endwise and thereby decrease the effective length of leverage, while when the pedal is on that part of its stroke above the horizontal it will be increasing its distance from the spindle 13 and will engage the abutment 9 for the purpose of drawing the lever farther out of the gear box thus increasing the effective leverage. As will be seen, on the down stroke of the pedal the leverage will thus be much greater than on the up stroke.

As shown the gear box is provided with rollers 19 engaging with the lever and which permit the lever to slide therein while at the same time serving to reciprocate the gear box.

What I claim then is:—

1. In pedal driving gear for cycles and the like the combination of a spindle; a crank on said spindle; a pedal carried by said crank; a second spindle; a gear box on said second spindle; a lever slidably engaging with said gear box and crank; and a one-way clutch in said gear box and connected to said second spindle, for the purpose specified and substantially as set forth.

2. In pedal driving gear for cycles and the like the combination of a spindle; a pair of cranks on said spindle; a pedal carried by each of said cranks; a second spindle; a pair of gear boxes carried by said second spindle; a pair of levers each slidably engaging with a gear box and crank; and a one-way clutch in each gear box and connected to said second spindle; for the purpose specified and substantially as set forth.

3. In pedal driving gear for cycles and the like the combination of a spindle; a pair of cranks on said spindle; a pedal carried by each of said cranks; antifriction rollers on said pedals; a second spindle; a pair of gear boxes on said second spindle; antifriction rollers on said gear boxes; a pair of levers each slidably engaging with the rollers on said gear box and crank; and a one-way clutch in each gear box and connected to said second spindle; for the purpose specified and substantially as set forth.

4. In pedal driving gear for cycles and the like the combination of a spindle; a pair of cranks on said spindle; a pedal carried by each of said cranks; antifriction rollers on said pedals; a second spindle; a pair of gear boxes on said second spindle antifriction rollers on said gear boxes; a pair of levers each slidably engaging with the rollers on said gear box and crank and having abutments thereon serving to limit the sliding movement between the lever and rollers; and a one-way clutch in each gear box and connected to said second spindle; for the purpose specified and substantially as set forth.

In testimony whereof I affix my signature.

HENRY BANNISTER JOHNSTON.

Copies of this patent may be obtained for five cents each, by addressing the "Commissioner of Patents, Washington, D. C."